United States Patent
Li et al.

(10) Patent No.: US 12,456,864 B2
(45) Date of Patent: Oct. 28, 2025

(54) INTERMITTENT CHARACTERISTIC-BASED DEMAND-SIDE RESOURCE COORDINATION CONTROL METHOD AND SYSTEM

(71) Applicants: CHINA ELECTRIC POWER RESEARCH INSTITUTE COMPANY LIMITED, Beijing (CN); STATE GRID CORPORATION OF CHINA, Beijing (CN)

(72) Inventors: Yaping Li, Beijing (CN); Shengchun Yang, Beijing (CN); Jianguo Yao, Beijing (CN); Jian Geng, Beijing (CN); Feng Li, Beijing (CN); Wenbo Mao, Beijing (CN); Yong Wang, Beijing (CN); Jun Liu, Beijing (CN); Kedong Zhu, Beijing (CN); Jiahao Yan, Beijing (CN); Jiantao Liu, Beijing (CN); Xiaorui Guo, Beijing (CN); Jing Zhou, Beijing (CN); Liwen Wang, Beijing (CN); Peng Xu, Beijing (CN); Lingling Pan, Beijing (CN)

(73) Assignees: CHINA ELECTRIC POWER RESEARCH INSTITUTE COMPANY LIMITED, Beijing (CN); STATE GRID CORPORATION OF CHINA, Beijing (CN)

( * ) Notice: Subject to any disclaimer, the term of this patent is extended or adjusted under 35 U.S.C. 154(b) by 454 days.

(21) Appl. No.: 18/010,429

(22) PCT Filed: Oct. 30, 2020

(86) PCT No.: PCT/CN2020/125426
§ 371 (c)(1),
(2) Date: Dec. 14, 2022

(87) PCT Pub. No.: WO2021/253706
PCT Pub. Date: Dec. 23, 2021

(65) Prior Publication Data
US 2023/0253793 A1    Aug. 10, 2023

(30) Foreign Application Priority Data
Jun. 15, 2020    (CN) .................... 202010543460.4

(51) Int. Cl.
*H02J 3/24* (2006.01)
*H02J 3/46* (2006.01)

(52) U.S. Cl.
CPC ............ *H02J 3/241* (2020.01); *H02J 3/46* (2013.01)

(58) Field of Classification Search
CPC ................ H02J 3/241; H02J 3/46; H02J 3/24
See application file for complete search history.

(56) References Cited

U.S. PATENT DOCUMENTS

| 2008/0114811 A1* | 5/2008 | Murdoch | H02J 3/00 |
| 2011/0066300 A1* | 3/2011 | Tyagi | H02J 3/144 |
| | | | 700/291 |

(Continued)

FOREIGN PATENT DOCUMENTS

| CN | 103729698 A | 4/2014 |
| CN | 106786511 A | 5/2017 |

(Continued)

OTHER PUBLICATIONS

S. Ali Pourmousavi et al., "LFC model for multi-area power systems considering dynamic demand response," 2016 IEEE/PES Transmission and Distribution Conference and Exposition (T&D), pp. 1-5, doi: 10.1109/TDC.2016.7519908 (2016).

(Continued)

*Primary Examiner* — Charles Cai
(74) *Attorney, Agent, or Firm* — ArentFox Schiff LLP; Joseph M. Maraia; Marlo S. Grolnic

(57) ABSTRACT

Provided an intermittent characteristic-based demand-side resource coordination control method and system. The (Continued)

method includes: receiving a control request, where the control request is used for requesting control of demand-side resources having an intermittent characteristic; determining a target total control quantity of demand-side resources; determining a coordination strategy of multiple demand-side resources and an action quantity of each of the multiple demand-side resources; and performing coordinated control on the multiple demand-side resources based on the target total control quantity of demand-side resources, the coordination strategy, and the action quantity of each of the multiple demand-side resources.

8 Claims, 5 Drawing Sheets

(56) References Cited

U.S. PATENT DOCUMENTS

| | | |
|---|---|---|
| 2013/0261830 A1 | 10/2013 | Han et al. |
| 2019/0324487 A1 | 10/2019 | Elbsat et al. |

FOREIGN PATENT DOCUMENTS

| | | |
|---|---|---|
| CN | 107565573 A | 1/2018 |
| CN | 107887975 A | 4/2018 |
| CN | 110739696 A | 1/2020 |
| CN | 111277007 A | 6/2020 |
| CN | 111668858 A | 9/2020 |
| EP | 3012937 B1 | 3/2020 |
| JP | 6082811 B2 | 2/2017 |
| JP | 2019041457 A | 3/2019 |

OTHER PUBLICATIONS

Guo et al., "Active power scheduling and control scheme for interconnected power grids considering time-space complementary characteristics of wind energy," Power System Protection and Control, vol. 42, No. 21, pp. 139-144 (2014).

Molina-Garcia et al., "Decentralized Demand-Side Contribution to Primary Frequency Control," IEEE Transactions on Power Systems, vol. 26, No. 1, pp. 411-419 (Feb. 2011).

Munoz-Benavente et al., "Impact of Combined Demand-Response and Wind Power Plant Participation in Frequency Control for Multi-Area Power Systems," Energies, vol. 12, DOI: 10.3390/en12091687, 19 pgs. (2019).

International Search Report from corresponding PCT Application No. PCT/CN2020/125426, mailed Feb. 25, 2021.

* cited by examiner

INTERMITTENT CHARACTERISTIC-BASED DEMAND-SIDE RESOURCE COORDINATION CONTROL METHOD AND SYSTEM

CROSS-REFERENCE TO RELATED APPLICATION(S)

This is a national stage application filed under 37 U.S.C. 371 based on International Patent Application No. PCT/CN2020/125426, filed Oct. 30, 2020, which claims priority to Chinese Patent Application No. 202010543460.4 filed with China National Intellectual Property Administration (CNIPA) on Jun. 15, 2020, the disclosures of which are incorporated herein by reference in their entireties.

TECHNICAL FIELD

The present disclosure relates to the technical field of power system automation, for example, an intermittent characteristic-based demand-side resource coordination control method and system.

BACKGROUND

The addition of new energy sources such as wind power reduces the inertia of existing power systems. Frequency control depending on resources on a power generation side cannot satisfy the requirements of a power grid. Demand-side resources which can respond quickly have been included into a frequency control system, so as to help the power grid recover to a stable frequency state under large disturbances.

Considering that the demand-side resources are essentially frequency regulation resources provided by a user, when a control center performs frequency control, the demand-side resources will be in two states of being on and being off so that the demand-side resources demonstrate a certain intermittent characteristic during the process of participating in frequency regulation. If a large number of demand-side resources directly participate in the frequency control of a power system without coordination, a large number of demand-side resources may be turned on or turned off at the same time, causing a huge load change and threatening the safety and stability of the power system. A demand-side resource coordination control method is not yet available, which considers control performance and resource costs while considering the intermittent characteristic of the demand-side resources.

SUMMARY

The present disclosure provides an intermittent characteristic-based demand-side resource coordination control method and system, which avoid a frequency fluctuation caused by the simultaneous recovery of a large scale of demand-side resources and can help a power grid to cope with large power disturbances.

An intermittent characteristic-based demand-side resource coordination control method is provided and includes steps described below.

A control request is received, where the control request is used for requesting the control of demand-side resources having an intermittent characteristic.

A target total control quantity of demand-side resources is determined.

A coordination strategy of multiple demand-side resources and an action quantity of each of the multiple demand-side resources are determined.

Coordinated control is performed on the multiple demand-side resources based on the target total control quantity of demand-side resources, the coordination strategy, and the action quantity of each of the multiple demand-side resources.

An intermittent characteristic-based demand-side resource coordination control system is provided, and the system includes a receiving module, a first determination module, a second determination module, and a control module.

The receiving module is configured to receive a control request, where the control request is used for requesting the control of demand-side resources having an intermittent characteristic.

The first determination module is configured to determine a target total control quantity of demand-side resources.

The second determination module is configured to determine a coordination strategy of multiple demand-side resources and an action quantity of each of the multiple demand-side resources.

The control module is configured to perform coordinated control on the multiple demand-side resources based on the target total control quantity of the demand-side resources, the coordination strategy, and the action quantity of each of the multiple demand-side resources.

An intermittent characteristic-based demand-side resource coordination control system is provided, and the system includes a processor and a memory.

The memory is coupled to the processor.

The memory stores a computer program. The processor is configured to execute the computer program to implement the preceding intermittent characteristic-based coordinated control method of the demand-side resources.

DETAILED DESCRIPTION

Technical solutions in embodiments of the present disclosure are described below in conjunction with the drawings in the embodiments of the present disclosure.

Unless otherwise defined, all technical and scientific terms used herein have the same meanings as those commonly understood by those skilled in the art to which the present disclosure pertains. The terms used herein are only used for describing embodiments and are not intended to limit the present disclosure. The term "and/or" used herein includes any or all combinations of one or more listed associated items.

Embodiment One

Figure 1:
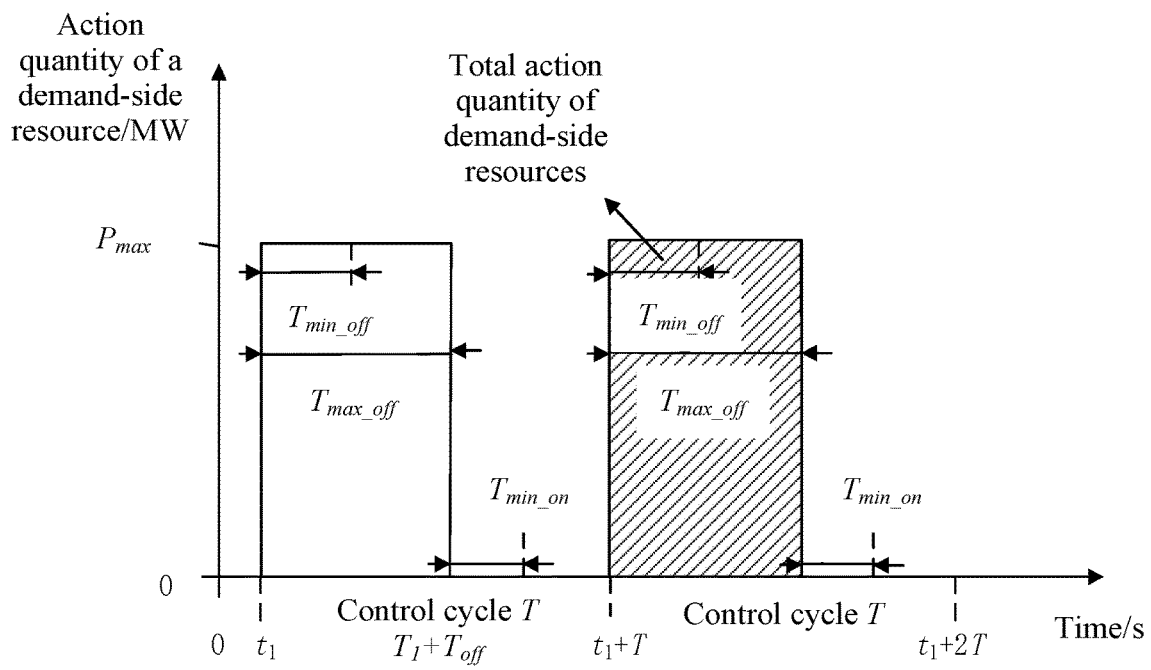
FIG. 1 is a schematic chart showing an intermittent characteristic of demand-side resources according to an embodiment.

FIG. 1 is a schematic chart showing an intermittent characteristic of demand-side resources according to an embodiment. As shown in FIG. 1, $P_{max}$ denotes maximum power of the demand-side resources that can participate in frequency control in a unit time. $T_{off}$ denotes the off time of the demand-side resources, and the demand-side resources participate in the frequency control of a power grid in the off time. $T_{min\_off}$ denotes the minimum off time of the demand-side resources. $T_{max\_off}$ denotes the maximum off time of the demand-side resources. $T_{min\_off}$ is used for preventing resources from frequent actions. $T_{max\_off}$ is depended on the actual requirements of a user. $T_{on}$ denotes the on time of the demand-side resources, and the demand-side resources do not participate in the frequency control of the power grid in the on time. $T_{min\_on}$ denotes the minimum on time of the demand-side resources and depends on the actual requirements of the user. During the participation in the frequency control, the total response quantity (cost) of the demand-side resources is represented by a shaded region.

Figure 2:
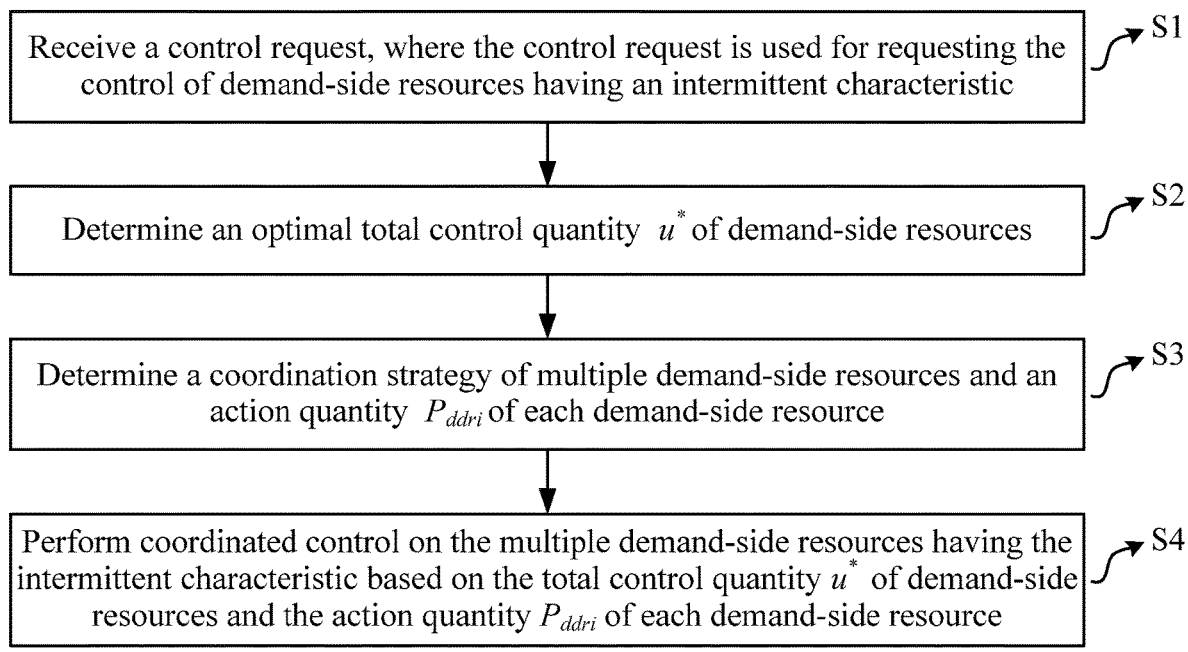
FIG. 2 is a schematic flowchart of an intermittent characteristic-based demand-side resource coordination control method according to an embodiment.

FIG. 2 is a schematic flowchart of an intermittent characteristic-based demand-side resource coordination control method according to an embodiment. The present disclosure provides an intermittent characteristic-based demand-side resource coordination control method. The method includes steps S1-S4 described below.

In S1, a control request is received, where the control request is used for requesting the control of demand-side resources having an intermittent characteristic.

In this step, the control request inputted by the user may be received from a user interface, and the control request is used for requesting the control of the demand-side resources having the intermittent characteristic.

In S2, an optimal total control quantity u* of demand-side resources is determined.

Figure 3:
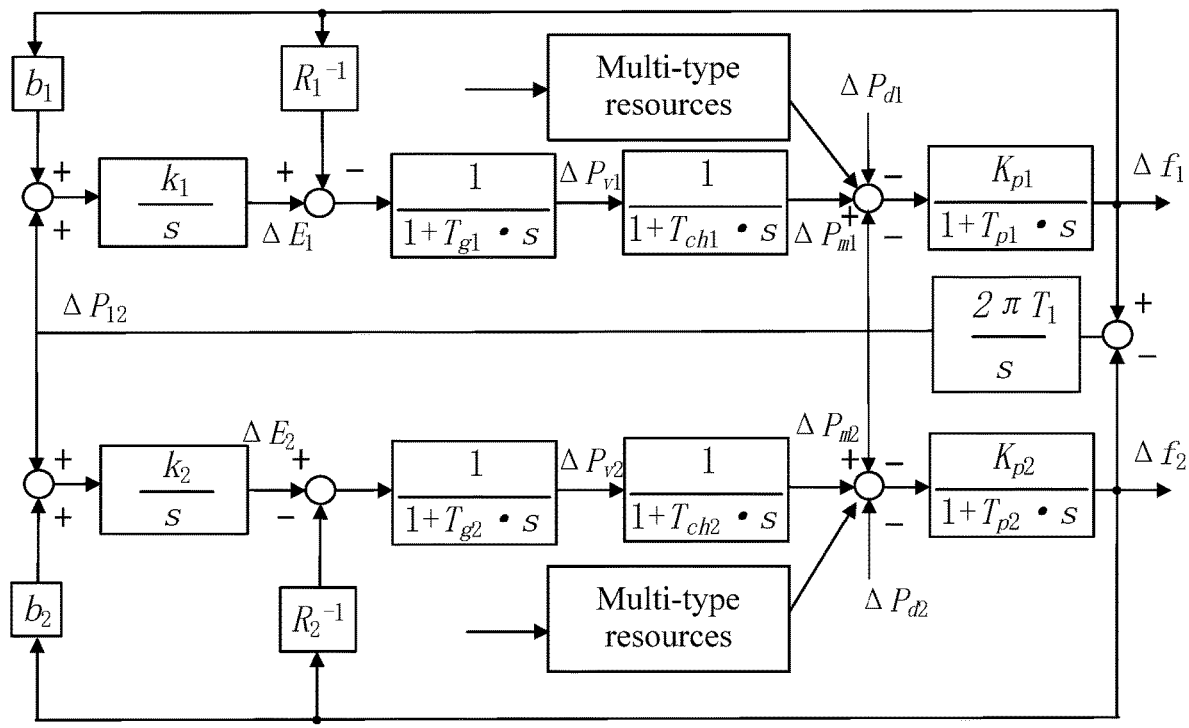
FIG. 3 is a schematic diagram of a system model for load-frequency control (LFC) of demand-side resources according to an embodiment.
Figure 4:
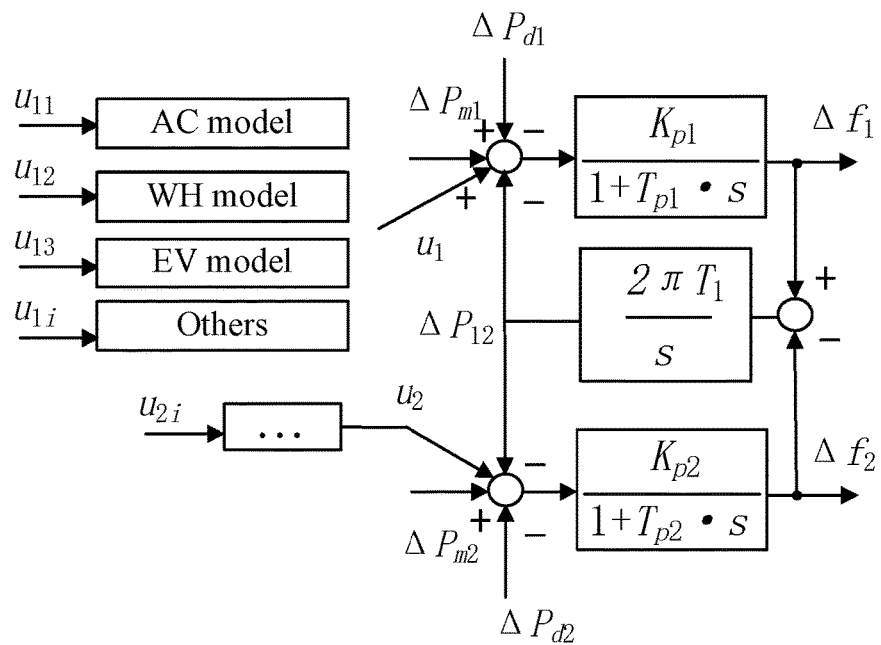
FIG. 4 is a schematic diagram of a coordinated control model of multi-type demand-side resources according to an embodiment.

In the present disclosure, a coordinated control model for multi-type demand-side resources is added to an LFC system. FIG. 3 shows the LFC system to which the coordinated control model for multi-type demand-side resources is added. FIG. 4 shows the coordinated control model for multi-type demand-side resources.

A state space model of the LFC system in FIG. 3 may be expressed according to the following equation:

$$\dot{x}=Ax+Bu;$$

where $x(t)=[\Delta f_1\ \Delta f_2]^T$ denotes a system state. $\Delta f_1$ and $\Delta f_2$ denote frequency deviations of region one and region two, respectively. u(t) denotes a total control quantity of demand-side resources. A denotes a system matrix, and B denotes an input matrix. In an embodiment, values of A and B are respectively expressed as follows:

$$A = \begin{bmatrix} -\frac{1}{T_{p1}} & 0 \\ 0 & -\frac{1}{T_{p2}} \end{bmatrix} \text{ and } B = \begin{bmatrix} -\frac{K_{p1}}{T_{p1}} & 0 \\ 0 & -\frac{K_{p2}}{T_{p2}} \end{bmatrix};$$

where $T_{p1}$ and $T_{p2}$ denote a time constant of region one and a time constant of region two, respectively, and $K_{p1}$ and $K_{p2}$ denote a gain constant of region one and a gain constant of region two, respectively.

An objective function is determined according to the following equation:

$$\min J = \int_0^\infty x^T(t)Qx(t) + u^T(t)Ru(t)dt;$$

where Q denotes a constant weight matrix of the system state, and R denotes a constant weight matrix of the total control quantity. u*(t) is solved based on a control objective of the system.

In an embodiment, different constant matrices Q and R are selected, the system matrix A and the input matrix B are substituted, and the following equation is solved to obtain an optimal value of a matrix P:

$$A^TP+PA-Q+PBR^{-1}B^TP=0.$$

Assuming that P* denotes a unique optimal positive definite solution, the total control quantity u*(t) of demand-side resources may be determined according to the following equation:

$$u^*=-K^*x=-R^{-1}BP^*x.$$

In S3, a coordination strategy of multiple demand-side resources and an action quantity $P_{ddri}$ of each demand-side resource are determined.

In an embodiment, that the coordination strategy of the multiple demand-side resources is determined includes steps described below.

Control cycles and control widths of different demand-side resources are acquired. The different demand-side resources are sorted according to magnitudes of the control widths, and demand-side resources satisfying a control condition are selected. Among the demand-side resources satisfying the control condition, a complementary resource of each of demand-side resource is selected in ascending order.

In an embodiment, a complementary resource is taken as one demand-side resource, and demand-side resources which require actions and the action quantity $P_{ddri}$ thereof are determined. When two complementary demand-side resources participate in the frequency control, only one demand-side resource is controlled at the same time, and the other demand-side resource replaces the currently controlled demand-side resource when the currently controlled demand-side resource is insufficient.

FIG. 4 is a schematic diagram of a coordinated control model of multi-type demand-side resources according to an embodiment.

The total control quantity of demand-side resources is u(t) which is formed by the multi-type demand-side resources and may be considered as an aggregate of the action quantity $u_i(t)$ of each demand-side resource, where $u_i(t)=L_i(t)$, and $L_i(t)$ denotes an intermittent characteristic of demand-side resources and is defined as follows:

$$L_i(t) = \begin{cases} P_{ddri} & nT \le t \le nT + \delta \\ 0 & nT + \delta \le t \le (n+1)T \end{cases};$$

where $P_{ddri}$ denotes the action quantity of an i-th demand-side resource, T denotes a control cycle, and $\delta = T_{off}$ denotes a control width.

After the optimal total control quantity u*(t) of demand-side resources is determined, the action quantity $P_{ddri}$ of each of the multiple demand-side resources needs to be coordinated, and the determination process may include two steps described below: the first step and the second step.

Figure 5:
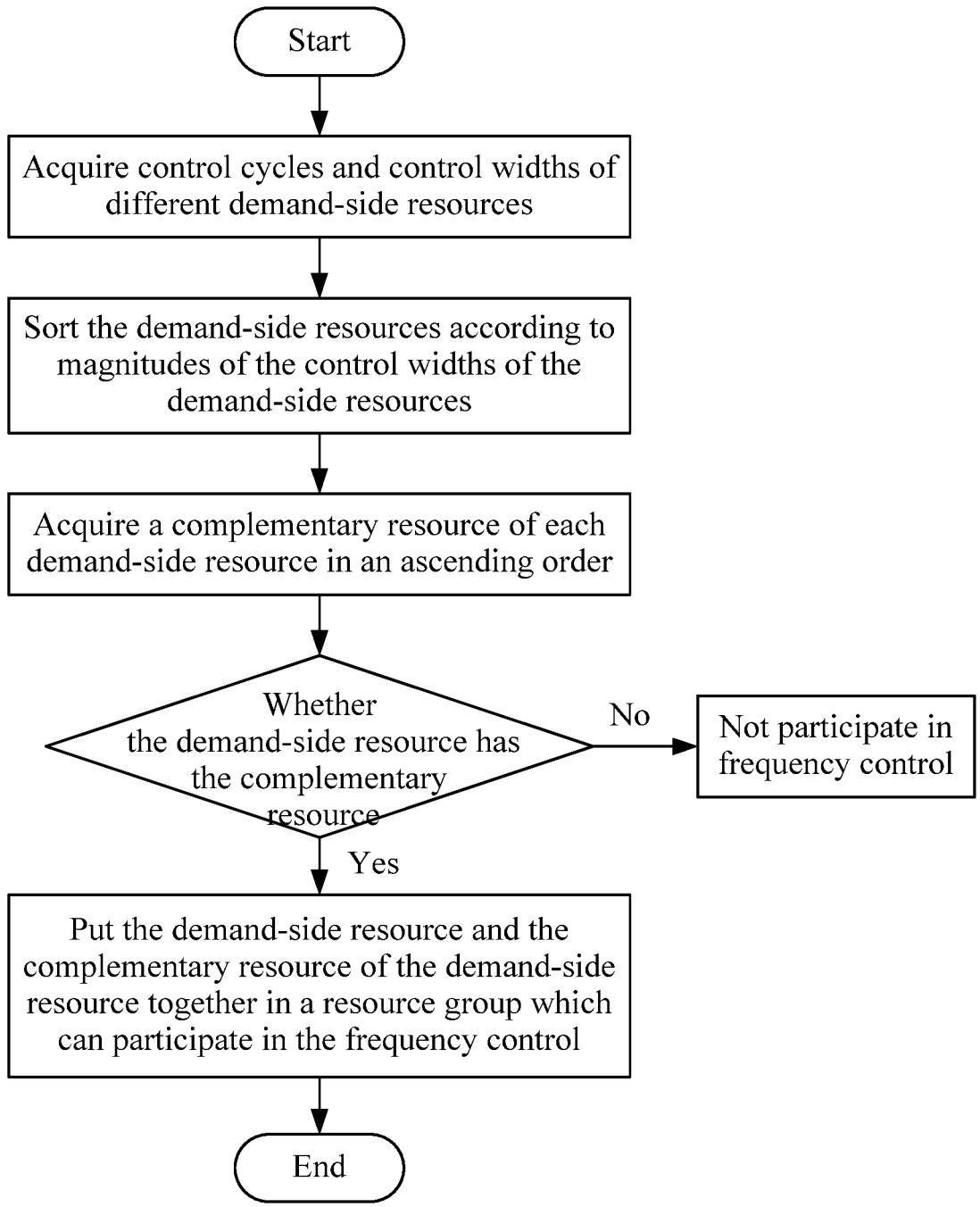
FIG. 5 is a schematic flowchart of a coordination strategy of demand-side resources according to an embodiment.

In the first step, the coordination strategy of the multiple demand-side resources is formulated in consideration of the intermittent characteristic. The overall flowchart of the coordination strategy is shown in FIG. 5.

(1) The control cycles T of different demand-side resources and the control widths δ of different demand-side resources are acquired.

(2) The different demand-side resources are sorted according to the magnitudes of the control widths δ, and the demand-side resources satisfying a control condition are selected.

(3) Among the demand-side resources satisfying the control condition, the complementary resource of each demand-side resource is selected in an ascending order. The demand-side resource having no complementary resource does not participate in the frequency control. For example, for the i-th demand-side resource, which has the control cycle being $T_i$ and the control width being $\delta_i$, a j-th demand-side resource complementary to the i-th demand-side resource is selected, and the demand-side resource j has the control cycle being $T_j$ and the control width being $\beta_j$. The j-th demand-side resource being complementary to the i-th demand-side resource needs to satisfy the following condition:

$\delta_i + \delta_j \ge \max(T_i, T_j)$.

Complementary resources exhibit characteristics of one of the complementary resources, and active powers of the complementary resources that can participate in the frequency control are as follows:

$$\begin{cases} P_{ddri}, & nT \le t \le nT + \delta_i \\ P_{ddrj}, & nT + \delta_i \le t \le nT + \delta_j \end{cases}.$$

(4) The demand-side resource and the complementary resource of the demand-side resource are put together in a resource group which can participate in the frequency control. When the complementary demand-side resources participate in the frequency control, the complementary demand-side resources need to perform an action according to a rule described below.

When the two complementary demand-side resources participate in the frequency control, only one demand-side resource of the two is controlled at the same time, and the other demand-side resource of the two will replace the currently controlled demand-side resource when the currently controlled demand-side resource is insufficient.

In the second step, based on the coordination strategy in the first step, it is necessary to determine, in consideration of resource costs, which demand-side resources require actions and their respective action quantities $P_{ddri}$.

The number N of demand-side resources which require actions and the action quantity $P_{ddri}$ of each demand-side resource are solved according to the following equations:

$$\min J_{ddr} = \sum_{i=1}^{N} C_i \times P_{ddri}$$

s.t.

$$u^* \le \sum_{i=1}^{N} P_{ddri}$$

$$N < N_{max};$$

where $C_i$ denotes a cost of the i-th demand-side resource, and $N_{max}$ denotes the maximum number of demand-side resources.

In S4, coordinated control is performed on the multiple demand-side resources having the intermittent characteristic based on the total control quantity u* of demand-side resources and the action quantity $P_{ddri}$ of each demand-side resource.

In this step, the system performs the coordinated control on the multiple demand-side resources having the intermittent characteristic based on the total control quantity u* of demand-side resources and the action quantity $P_{ddri}$ of each demand-side resource and outputs a result of the coordinated control through a user interface.

According to the preceding steps, a test example is provided herein and system parameters are set according to Table 1.

TABLE 1

| LFC system parameters | | | | | |
|---|---|---|---|---|---|
| $T_{g1}$ | $T_{g2}$ | $T_{ch1}$ | $T_{ch2}$ | $K_{p1}$ | $K_{p2}$ |
| 0.15 | 0.2 | 0.31 | 0.3 | 1 | 1 |
| $T_{p1}$ | $T_{p2}$ | $b_1$ | $b_2$ | $R_1$ | $R_2$ |
| 10 | 10 | 2 | 2 | 1 | 1 |

Figure 6:
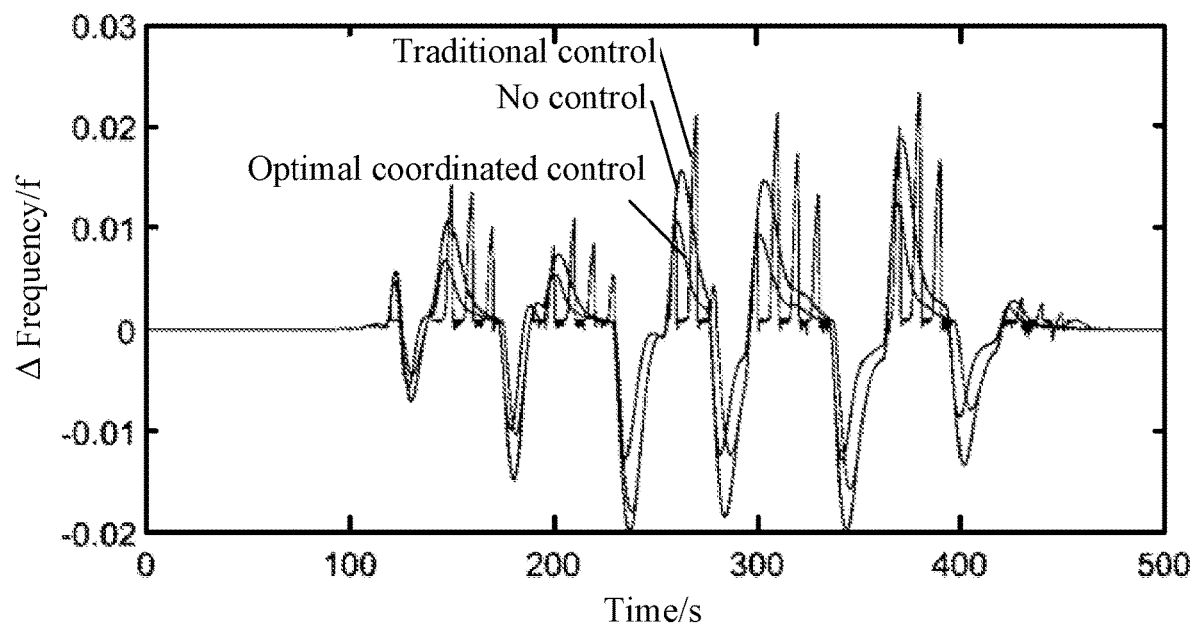
FIG. 6 is a schematic graph showing frequency deviations under a coordination strategy according to an embodiment.
Figure 7:
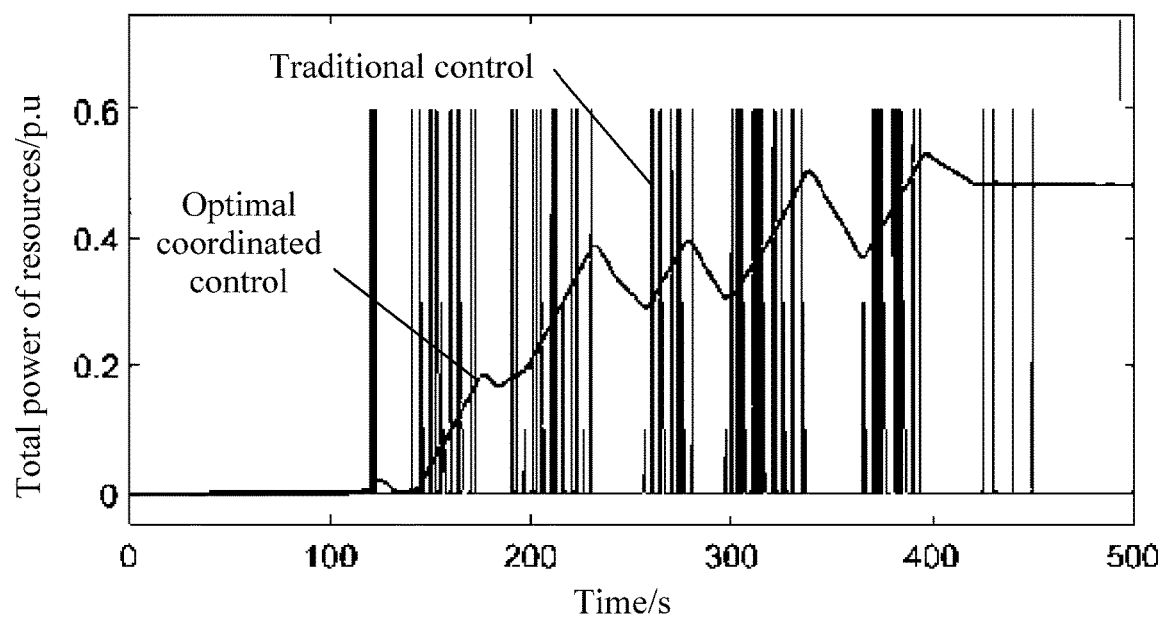
FIG. 7 is a schematic graph showing total power of resources participating in frequency regulation according to an embodiment.
Figure 8:
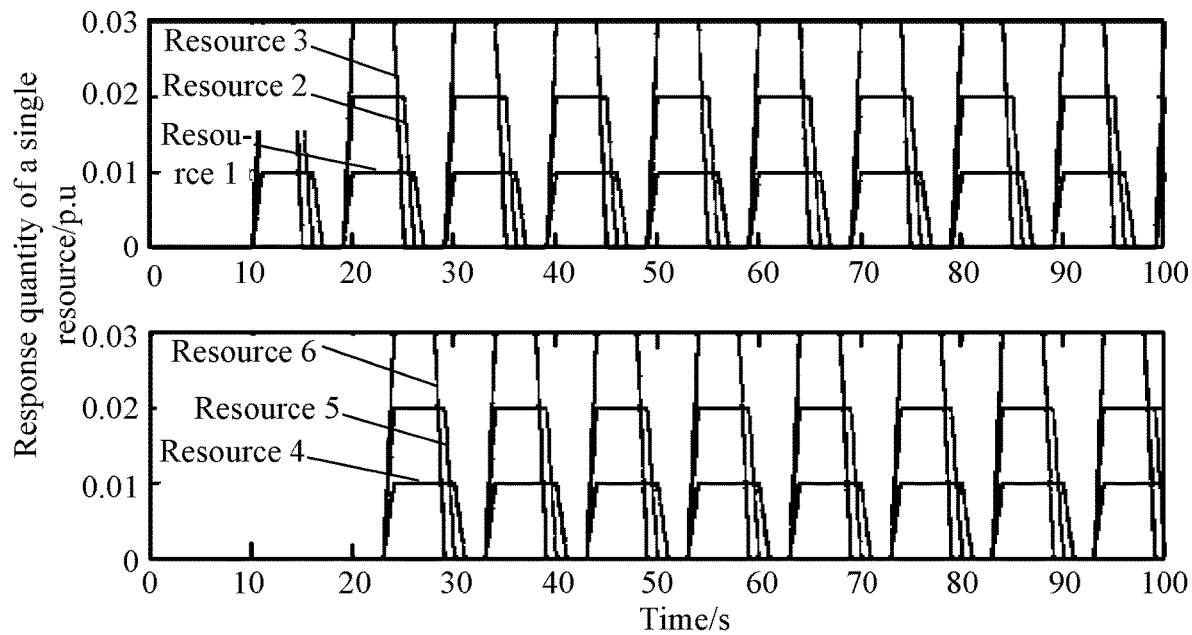
FIG. 8 is a schematic graph showing actions of resources under coordinated control according to an embodiment.

Through simulation, it can be obtained that by the method provided by the present disclosure, the frequency deviation is shown in FIG. 6, the situation of total resources participating in frequency regulation is shown in FIG. 7, and the intermittent characteristic of the resources is shown in FIG. 8.

Embodiment Two

Figure 9:
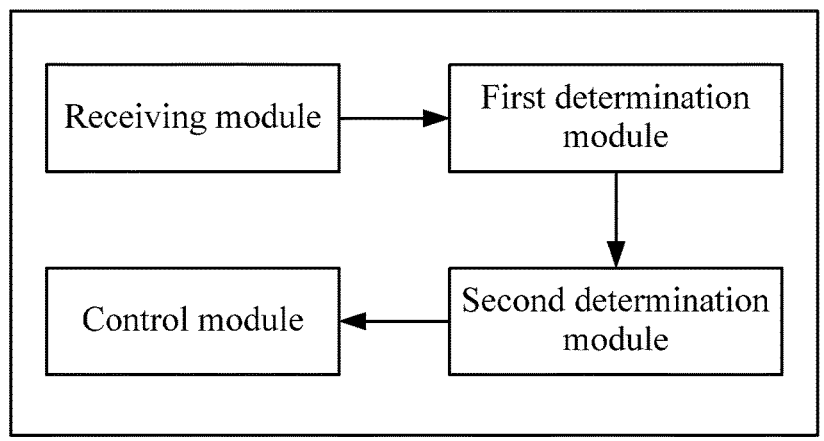
FIG. 9 is a schematic diagram of an intermittent characteristic-based demand-side resource coordination control system according to an embodiment.

FIG. 9 is a schematic diagram of an intermittent characteristic-based demand-side resource coordination control system according to an embodiment. As shown in FIG. 9, the present disclosure further provides an intermittent characteristic-based demand-side resource coordination control system. The system includes a receiving module, a first determination module, a second determination module, and a control module.

The receiving module is configured to receive a control request, where the control request is used for requesting control of demand-side resources having an intermittent characteristic. The first determination module is configured to determine n optimal total control quantity u* of demand-side resources. The second determination module is configured to determine a coordination strategy of multiple demand-side resources and an action quantity $P_{ddri}$ of each of the multiple demand-side resources. The control module is configured to perform coordinated control on the multiple demand-side resources having the intermittent characteristic based on the total control quantity u* of demand-side resources and the action quantity $P_{ddri}$ of each resource.

How the total control quantity u* of demand-side resources is determined includes steps described below.

An objective function is determined according to the following equation:

$$\min J = \int_0^\infty x^T(t)Qx(t) + u^T(t)Ru(t)dt;$$

where Q denotes a constant weight matrix of a system state, and R denotes a constant weight matrix of the total control quantity. u*(t) is solved based on a control objective of a system.

Different constant matrices Q and R are selected, a system matrix A and an input matrix B are substituted, and the following equation is solved to obtain an optimal value of a matrix P:

$$A^T P + PA - Q + PBR^{-1}B^T P = 0.$$

Assuming that P* denotes a unique optimal positive definite solution that is obtained, the total control quantity u*(t) of demand-side resources may be determined according to the following equation:

$$u^* = -K^* x = -R^{-1}BP^* x.$$

In an embodiment, How the coordination strategy of the multiple demand-side resources is determined includes steps described below.

Control cycles and control widths of different demand-side resources are acquired. The different demand-side resources are sorted according to magnitudes of the control widths, and demand-side resources satisfying a control condition are selected. Among the demand-side resources satisfying the control condition, a complementary resource of each demand-side resource is selected in ascending order.

In an embodiment, complementary demand-side resources are put together in a resource group which can participate in the frequency control, and demand-side resources which require actions and the action quantity $P_{ddri}$ thereof are determined. When two complementary demand-side resources participate in the frequency control, only one demand-side resource of the two is controlled at the same time, and the other demand-side resource of the two replaces the currently controlled demand-side resource when the currently controlled demand-side resource is insufficient.

The number N of demand-side resources which require actions and the action quantity $P_{ddri}$ of each demand-side resource are solved according to the following equations:

$$\min J_{ddr} = \sum_{i=1}^{N} C_i \times P_{ddri}$$

s.t.

$$u^* \leq \sum_{i=1}^{N} P_{ddri}$$

$$N < N_{max};$$

where $C_i$ denotes a cost of the i-th demand-side resource, and $N_{max}$ denotes the maximum number of demand-side resources.

In this embodiment, functions performed by multiple modules in the system are the same as the steps of the method in embodiment one, and the details are not repeated herein.

In the present disclosure, an optimal control strategy is designed for the system so that the total control quantity of demand-side resources can be provided under certain performance and cost requirements. According to the present disclosure, the coordinated control strategy of the multiple demand-side resources is designed based on the intermittent characteristic of the demand-side resources. Compared with uncoordinated actions of demand-side resources, the coordinated control strategy improves the stability of a power system. According to the present disclosure, based on the total control quantity of demand-side resources and the action quantity of each demand-side resource, the coordinated control is performed on the multiple demand-side resources having the intermittent characteristic so that the coordinated control can be performed on multiple demand-side resources having the intermittent characteristic, which can not only avoid a frequency fluctuation caused by the simultaneous recovery of a large scale of demand-side resources but also help a power grid to cope with large power disturbances.

Embodiment Three

Figure 10:
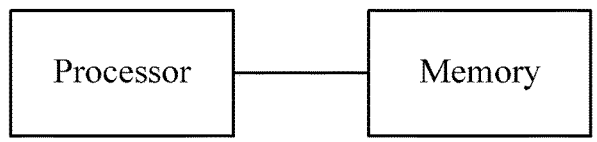
FIG. 10 is another schematic diagram of an intermittent characteristic-based demand-side resource coordination control system according to an embodiment.

FIG. 10 is another schematic diagram of an intermittent characteristic-based demand-side resource coordination control system according to an embodiment. The present disclosure further provides an intermittent characteristic-based demand-side resource coordination control system as shown in FIG. 10. The system includes a processor and a memory. The memory is coupled to the processor. The memory stores a computer program. The processor is configured to execute the computer program to implement the intermittent characteristic-based coordinated control method of the demand-side resources in embodiment one.

In this embodiment, the steps of the method performed by the processor are the same as the steps of the method in embodiment one, and the details are not repeated herein.

The embodiments of the present application may be provided as methods, systems, or computer program products. Therefore, the present application may take the form of complete hardware embodiments, complete software embodiments, or embodiments combining software and hardware aspects. Moreover, the present application may take the form of a computer program product implemented on one or more computer-usable storage media (including, but not limited to, a disk memory, a compact disc read-only memory (CD-ROM), an optical memory, and the like) which include computer-usable program codes.

The present application is described according to flowcharts and/or block diagrams of methods, devices (systems), and computer program products according to embodiments of the present application. It is to be understood that computer program instructions may implement each flow and/or block in the flowcharts and/or the block diagrams and a combination of flows and/or blocks in the flowcharts and/or the block diagrams. These computer program instructions may be provided to a processor of a general-purpose computer, a special-purpose computer, an embedded processor, or another programmable data processing device to produce a machine so that instructions, which are executed by the processor of the computer or another programmable data processing device, create an apparatus configured to implement the functions specified in one or more flows in the flowcharts and/or in one or more blocks in the block diagrams.

These computer program instructions may also be stored in a computer-readable memory which is able to direct a computer or another programmable data processing device to operate in a particular manner so that the instructions stored in the computer-readable memory produce an article of manufacture including an instruction apparatus which implements the functions specified in one or more flows in the flowcharts and/or in one or more blocks in the block diagrams.

These computer program instructions may also be loaded onto a computer or another programmable data processing device so that a series of operation steps are performed on the computer or another programmable device to produce processing implemented by a computer. Therefore, instructions executed on a computer or another programmable device provide steps for implementing the functions specified in one or more flows in the flowcharts and/or in one or more blocks in the block diagrams.

What is claimed is:

1. An intermittent characteristic-based demand-side resource coordination control method, comprising:
receiving a control request, wherein the control request is used for requesting control of demand-side resources having an intermittent characteristic;
determining an optimal total control quantity of demand-side resources;
determining a coordination strategy of a plurality of demand-side resources and an action quantity of each of the plurality of demand-side resources; and
performing coordinated control on the plurality of demand-side resources based on the optimal total control quantity of demand-side resources, the coordination strategy, and the action quantity of each of the plurality of demand-side resources;
wherein determining the optimal total control quantity of demand-side resources comprises:
determining an objective function min $$J = \int_0^\infty x^T(t)Qx(t) + u^T(t)Ru(t)dt,$$

wherein $x(t)=[\Delta f_1 \ \Delta f_2]^T$ denotes a system state, $\Delta f_1$ and $\Delta f_2$ denote respectively frequency deviations of two regions in a system, u(t) denotes a total control quantity of demand-side resources, Q denotes a constant weight matrix of the system state, and R denotes a constant weight matrix of the total control quantity; and
solving, based on a control objective of the system, the optimal total control quantity u*(t) of demand-side resources.

2. The method according to claim 1, wherein a state space model of the system is that $\dot{x}(t)=Ax(t)+Bu$, wherein A denotes a system matrix, and B denotes an input matrix; and
wherein solving, based on the control objective of the system, the optimal total control quantity u*(t) of demand-side resources comprises:
selecting different constant weight matrices Q and R, substituting the system matrix A and the input matrix B, and solving the following equation to obtain a target value of a matrix P:

$A^TP+PA-Q+PBR^{-1}B^TP=0;$ and assuming that P* is a unique target positive definite solution which is obtained, determining the optimal total control quantity u*(t) of demand-side resources according to the following equation:

$u^*(t)=-K^*x(t)=-R^{-1}BP^*x(t).$

3. The method according to claim 1, wherein the coordination strategy comprises:
acquiring a control cycle of each of the plurality of demand-side resources and a control width of each of the plurality of demand-side resources;
sorting acquired control widths of the plurality of demand-side resources in a descending order, and selecting a plurality of demand-side resources corresponding to control widths in a sorting result and satisfying a control condition;
among the plurality of selected demand-side resources, determining, according to control cycles of the plurality of selected demand-side resources and control widths of the plurality of selected demand-side resources in an ascending order of control widths, whether each selected demand-side resource has a complementary resource; in response to a selected demand-side resource having the complementary resource, putting the selected demand-side resource and the complementary resource of the selected demand-side resource in a resource group participating in the coordinated control; and in response to the selected demand-side resource having no complementary resource, the selected demand-side resource does not participate in the coordinated control; and
in a case where the selected demand-side resource has the complementary resource, determining an active power of the complementary resource participating in the coordinated control, putting the complementary resource in the resource group participating in the coordinated control, and taking the active power as an action quantity of the complementary resource;
wherein in a case where two complementary demand-side resources participate in the coordinated control, only one of the two complementary demand-side resources is controlled at a same time, and the other of the two complementary demand-side resources replaces the one of the two complementary demand-side resources that is being controlled in a case where the one of the two complementary demand-side resources that is being controlled is insufficient.

4. The method according to claim 3, wherein the coordination strategy further comprises: solving, according to the following equations, a number N of demand-side resources in the resource group participating in the coordinated control and an action quantity $P_{ddri}$ of each of the demand-side resources actually participating in the coordinated control:

$$\min J_{ddr} = \sum_{i=1}^{N} C_i \times P_{ddri}$$

s.t.

$$u^*(t) \le \sum_{i=1}^{N} P_{ddri}$$

$N < N_{max};$ wherein $C_i$ denotes a cost of an i-th demand-side resource actually participating in the coordination control, and $N_{max}$ denotes a number of demand-side resources in the resource group participating in the coordinated control.

5. An intermittent characteristic-based demand-side resource coordination control system, comprising: a processor and a memory coupled to the processor;
wherein the memory stores a computer program, and the processor is configured to execute the computer program to:
receive a control request, wherein the control request is used for requesting control of demand-side resources having an intermittent characteristic;
determine an optimal total control quantity of demand-side resources;
determine a coordination strategy of a plurality of demand-side resources and an action quantity of each of the plurality of demand-side resources; and
perform coordinated control on the plurality of demand-side resources based on the optimal total control quantity of demand-side resources, the coordination strategy, and the action quantity of each of the plurality of demand-side resources; wherein the processor is configured to execute the computer program to:
determine an objective function min $$J = \int_0^\infty x^T(t)Qx(t) + u^T(t)Ru(t)dt,$$

wherein $x(t)=[\Delta f_1 \ \Delta f_2]^T$ denotes a system state, $\Delta f_1$ and $\Delta f_2$ denote respectively frequency deviations of two regions in a system, u(t) denotes a total control quantity of demand-side resources, Q denotes a constant weight matrix of the system state, and R denotes a constant weight matrix of the total control quantity; and
solve, based on a control objective of the system, the optimal total control quantity u*(t) of demand-side resources.

6. The system according to claim 5, wherein a state space model of the system is that $\dot{x}(t)=Ax(t)+Bu$, wherein A denotes a system matrix, and B denotes an input matrix; and
wherein the processor is configured to execute the computer program to solve, based on the control objective of the system, the optimal total control quantity u*(t) of demand-side resources in the following manner:
selecting different constant weight matrices Q and R, substituting the system matrix A and the input matrix B, and solving the following equation to obtain a target value of a matrix P:

$A^TP+PA-Q+PBR^{-1}B^TP=0$; and assuming that P* is a unique target positive definite solution that is obtained, determining the optimal total control quantity u*(t) of demand-side resources according to the following equation:

$u^*(t)=-K^*x(t)=-R^{-1}BP^*x(t).$

7. The system according to claim 5, wherein the coordination strategy comprises:

acquiring a control cycle of each of the plurality of demand-side resources and a control width of each of the plurality of demand-side resources;
sorting acquired control widths of the plurality of demand-side resources in a descending order, and selecting a plurality of demand-side resources corresponding to control widths in a sorting result and satisfying a control condition;
among the plurality of selected demand-side resources, determining, according to control cycles of the plurality of selected demand-side resources and control widths of the plurality of selected demand-side resources in an ascending order of control widths, whether each selected demand-side resource has a complementary resource; in response to a selected demand-side resource having the complementary resource, putting the selected demand-side resource and the complementary resource of the selected demand-side resource in a resource group participating in the coordinated control; and in response to the selected demand-side resource having no complementary resource, the selected demand-side resource does not participate in the coordinated control; and
in a case where the selected demand-side resource has the complementary resource, determining an active power of the complementary resource participating in the coordinated control, putting the complementary resource in the resource group participating in the coordinated control, and taking the active power as an action quantity of the complementary resource;
wherein in a case where two complementary demand-side resources participate in the coordinated control, only one of the two complementary demand-side resources is controlled at a same time, and the other of the two complementary demand-side resources replaces the one of the two complementary demand-side resources that is being controlled in a case where the one of the two complementary demand-side resources that is being controlled is insufficient.

8. The system according to claim 7, wherein the coordination strategy further comprises: solving, according to the following equations, a number N of demand-side resources in the resource group participating in the coordinated control and an action quantity $P_{ddri}$ of each of the demand-side resources actually participating in the coordinated control:

$$\min J_{ddr} = \sum_{i=1}^{N} C_i \times P_{ddri}$$

s.t.

$$u^*(t) \le \sum_{i=1}^{N} P_{ddri}$$

$$N < N_{max};$$

wherein $C_i$ denotes a cost of an i-th demand-side resource actually participating in the coordination control, and $N_{max}$ denotes a number of demand-side resources in the resource group participating in the coordinated control.

* * * * *